Figure 1:
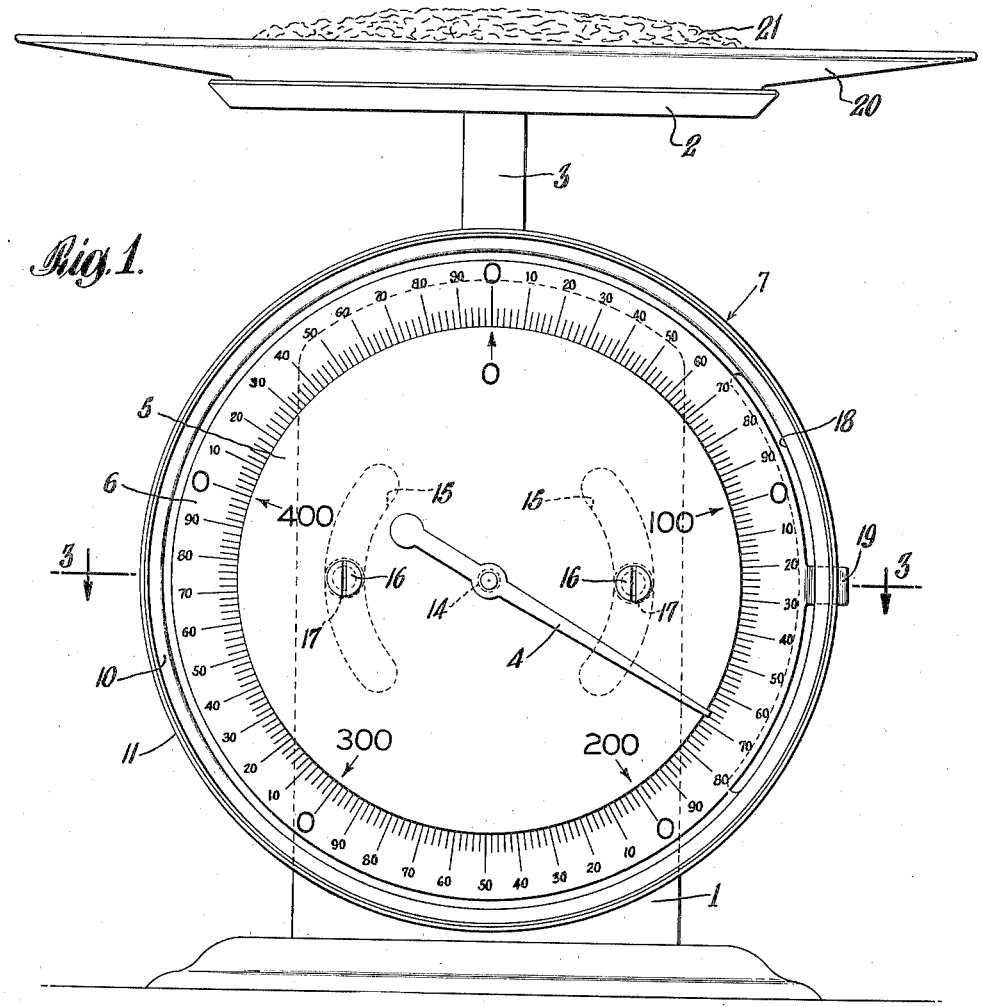

April 8, 1941.  G. E. CHATILLON  2,237,653
SCALE
Filed April 30, 1938   2 Sheets-Sheet 1

INVENTOR.
George E. Chatillon.
BY
Donald W. Robertson
ATTORNEY.

Patented Apr. 8, 1941

2,237,653

UNITED STATES PATENT OFFICE 2,237,653

SCALE

George E. Chatillon, New York, N. Y., assignor to John Chatillon & Sons, New York, N. Y., a corporation of New York Application April 30, 1938, Serial No. 205,235

2 Claims. (Cl. 116—129)

The invention relates to weighing mechanism, and particularly to dietary or other "weighing on" scales. By this I mean scales which are constructed to provide means for weighing separately a number of items while the scale is loaded cumulatively.

Taking the dietary scale as representative of the type of weighing device to which the present invention is applicable, I shall base the major part of the description which is to follow on this form of scale. Dietary scales usually have a movable dial so arranged that after each element of a prescribed diet is placed on the scale in its turn, and is separately weighed, the dial can be turned to a new zero setting. The new zero setting is obtained by turning the dial to the position in which the zero graduation coincides with the new position of the pointer. The next element, which is to be added to the scale without removing those previously weighed, can thus be weighed without arithmetical calculation, a direct reading for the weight of each added element being obtainable in turn. Such movable dial scales are generally designed so that after all of the items have been separately weighed on, the dial can be returned to its original zero position, whereupon a direct reading of the total weight of all the items is obtainable. A serious disadvantage of this type of scale is that the movable scale eventually turns around into a position in which all of the numerals are upside down and therefore quite difficult to read. Besides the inconvenience of the arrangement, there is thus introduced a source of possible error in reading. The existence of such a possible source of error is a defect of a fundamental character. In a dietary scale the presence of any source of confusion in reading is particularly to be avoided because of the complications otherwise inherent in the process of cumulative weighing.

Another disadvantage of the ordinary resettable dial scale is that the dial must be arranged for a very wide arc of movement. If the scale extends all around the dial, as is desirable, it becomes necessary to provide a permissible movement of 360° in order that the full capacity of the scale will be utilizable. Where glass-enclosed dials are desired, this introduces complications in the design of suitable actuating mechanism for setting the dial.

It is an object of the present invention to provide a movable dial scale which is not subject to any of the disadvantages I have pointed out.

A specific object of my invention is to provide a scale of the class described in which the numerals always remain rightside up. Another specific object is to provide a scale of the resettable dial type in which successive zero settings can be effected with only a limited movement of the dial.

A general object of the invention is to provide improvements in resettable scales such as dietary scales. Other objects and advantages will appear as the description proceeds.

Figure 3:
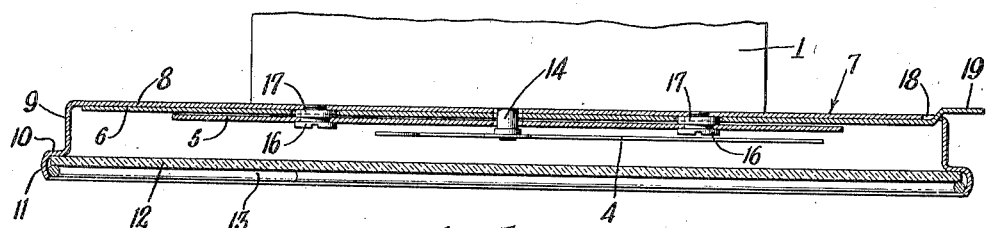
Figure 2:
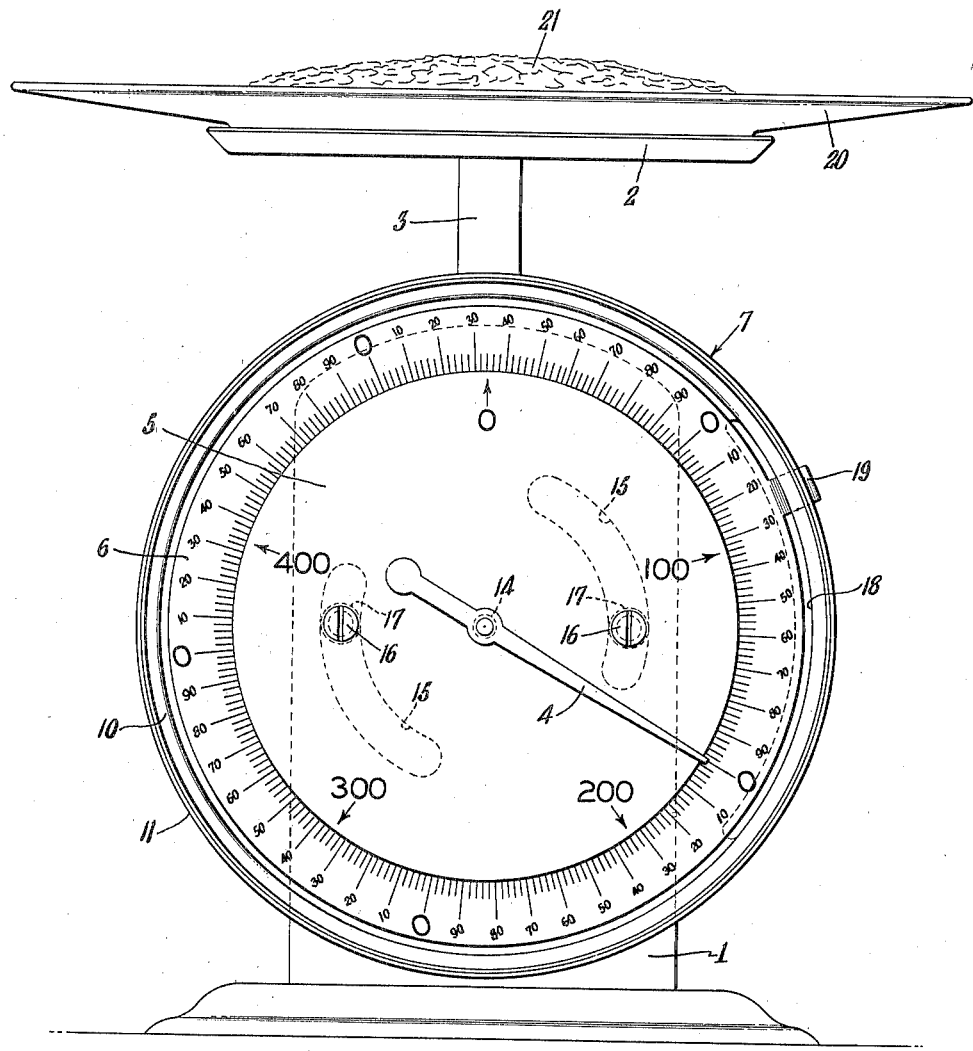

I have illustrated in the drawings a preferred embodiment of my invention as applied to a dietary scale. Fig. 1 is a front elevational view of such a scale, the parts being shown in the relative positions which they occupy at the conclusion of any given step in the weighing. Fig. 2 is a view similar to Fig. 1 but showing the movable dial reset to one of its zero positions. Fig. 3 is a cross sectional view through the dials and associated structure of Fig. 1 taken as indicated at 3—3, but to an enlarged scale.

In the embodiment selected for the purpose of illustration, the principal elements of the weighing mechanism are contained within the body 1 of the scale. This mechanism may be of any of the well known types and it forms no part of the present invention. The weighing platform 2 is carried by a column 3 which may be connected to, or form a part of, a rack or other element cooperating with the mechanism which actuates the load pointer 4. Associated with the pointer 4 is a stationary dial 5 and a movable dial 6. These may be secured to the body of the scale in any convenient manner. Because one of the features of my invention is of particular value as applied to scales having glass enclosed dials, I have shown such a construction in the drawings. This may comprise a dial housing member 7 secured to the body 1 of the scale. This housing may consist of a back portion 8 carrying a marginal flange 9 providing a recess to receive the dials 5 and 6. The marginal flange 9 may have a shoulder 10 terminating in a curved flange 11 to receive the glass or other transparent face member 12 which is secured against the shoulder 10 in any convenient manner, as by means of the circumferential wire clip 13. (The glass face is omitted in Figs. 1 and 2.) The actuating shaft 14 for the pointer 4 extends through aligned openings in the housing 7 and dials 5 and 6.

The movable dial 6 is provided with arcuate slots 15 in line with apertures in the stationary dial 5 to receive the attaching screws 16 which are to position the stationary dial and assist in guiding the movable dial, and to limit the extent of its movement. Spacing collars 17 may be arranged between the back 8 of the housing and the stationary dial 5 to maintain sufficient clearance for free movement of the dial 6 which is to oscillate about the center of the shaft 14. The housing 7 is provided with an arcuate slot 18 which may conveniently be located in the back 8 of the housing adjacent the flange 9. An offset extension 19 of the movable dial 6 is arranged to project through this slot, providing a handle for setting the dial. A pan or plate 20 may be placed on the platform 2 to receive the substance 21 which is being weighed.

The scale shown is one of 500 grams capacity and the outer or movable dial 6 is graduated accordingly from zero to 500 grams, these two limits coinciding at the top of the scale so that the graduations occupy the full 360° of the dial. The hundreds indications are preferably each marked "0." The stationary scale is provided with graduations corresponding to the hundreds indications of the dial 6. It will be understood that the scale might be graduated in accordance with the English system of weights and measures, if desired. In Fig. 1 the scale 6 is shown in its initial zero position in which the zero indication at the top of the movable dial is aligned with the zero indication of the fixed dial. The numerals for the hundreds indications of the dial 5 are arranged on substantially parallel horizontal lines; and this dial being fixed, they must remain so. The numerals for the indications of the scale on the dial 6 likewise are arranged on substantially parallel horizontal lines for the initial position of this dial shown in Fig. 1. Since this dial moves through only a small arc, these numerical indicia remain always in a substantially upright position, or in a position which is never inclined beyond a normal readable angle. I prefer to place the graduations for the smallest units of the movable dial scale adjacent the edge of the fixed dial so that the pointer 4 can be made short enough to lie entirely within the circle of the numerals on the movable dial, but so that it will still reach the graduations. That is to say, I prefer to arrange the graduations on the inside of the circle of numerals. It may be considered by way of example that the load shown on the scale represents the first item of a prescribed diet. The reading of its weight is obtained from the hundreds indications of the fixed dial in combination with the unit indications of the movable dial. Thus with the pointer in the position shown, the reading would be 167 grams. Ordinarily the weight of single items of a diet will not exceed 100 grams. Assuming, however, that one of the larger quantities does exceed 100 grams, it will be seen from the illustration chosen how the reading is obtained by combining the indications of the two dials.

The movable dial is now shifted by means of the handle 19 into the position shown in Fig. 2 in order to bring the nearest zero indication of the movable dial directly in line with the pointer. With a 500 gram scale and five zero indications on the movable dial, the slot 18 can be made to extend for less than a quarter of the circumference of the dial and it would still be possible to bring some one of the zero indications in line with the pointer irrespective of the position of the latter. It will be seen that with the parts in the position shown in Fig. 1, the zero indication which lies opposite the 200 grams indication of the fixed dial is nearest to the pointer, and it is this zero indication which has been brought in line with the pointer by shifting the handle 19 to the position shown in Fig. 2. Thereafter the next item of the diet is added to the scale while observing the indications of the movable dial in weighing on the correct amount. After this, the nearest zero indication of the movable dial is again brought into alignment with the pointer in its new position. This procedure is continued until all of the items have been weighted out, or until the capacity of the scale has been reached. At the conclusion of each intermediate weighing operation, an approximate check on the total weight is available by combining the readings of the two scales.

After the last item has been weighed on, the dial 6 is returned to its initial position, bringing the handle 19 into the position shown in Fig. 1 with the zero indications of the two dials in alignment. The readings of the dials will then show the exact total weight of all of the items, the hundreds being read from the fixed dial and the units from the movable one.

It will be observed in connection with the entire procedure which has been described to show the operation of my improved scale, that the hundreds indications remain always in an upright position. This is substantially true as well with respect to the tens indications, the numerals of which may be arranged so as to be in an upright position when the dial is in the initial zero setting of Fig. 1. By reason of the fact that the arc of movement of the dial 6 is so small, these numerals remain in a substantially upright position even when the dial is shifted to either of its extreme limiting positions. The arcuate slots 15 in the movable dial are made of such an extent as to limit the movement of the dial within an angle which is equal to, or not substantially greater than, that between two successive zero indications. Another feature of my arrangement resides in the provision of several series of graduations arranged in succession around the periphery of the movable dial, providing a plurality of zero indications so that the dial may be reset more easily and quickly. This applies both to the resetting of the dial for successive weighing operations and to the returning of the dial to its initial zero position after the last item has been weighed on. In the ordinary dietary scale, if the pointer is aimed at the base of the scale at the conclusion of weighing, it is necessary to move the dial through 180° in order to obtain the final total reading whereas with the arrangement I have shown, the maximum movement required for any intermediate or final resetting operation would be ⅕ of the circumference, or 72°. The fact that the total requisite movement of the dial is so small is of particular value when the resetting handle extends through a slot in the side or back of the scale housing as where the dials are covered with glass.

It will be understod that the invention is applicable to scales of varying capacities and that a greater or lesser number of zero indications can be employed as may be desired. I prefer to have at least three series of numerals, providing at least three zero points. It would be possible to reverse the arrangement of the dials so that it is the smaller or inner one which is movable and the larger or outside dial which is fixed. Other modifications will suggest themselves to those who are familiar with weighing mechanisms.

The terms and expressions which I have employed are used as terms of description and not of limitation, and I have no intention of excluding such equivalents of the invention set forth, or of portions thereof, as fall within the purview of the claims.

I claim:

1. Apparatus for indicating the magnitude of each of a series of cumulative loads which comprises a dial and a load pointer, the dial having a permanently fixed graduated part having a zero indication and a movable graduated part having five zero indications spaced to correspond with graduations of the fixed part, the movable part being adjustable to bring one of its zero indications in alignment with the load pointer after each weighing operation for all positions of the load pointer within a full 360 degree circle, and means for limiting the movement of the movable part within an angle which is not less than 72 degrees and not more than 90 degrees.

2. Apparatus for indicating the magnitude of each of a series of cumulative loads which comprises a dial and a load pointer, the dial having a movable graduated part and a graduated part which is immovable during a succession of weighing operations, the movable part bearing five repeated series of numerals arranged in succession around its periphery and an end point of each series being spaced to correspond with graduations of the fixed part, the movable part being adjustable to bring one of the end point graduations of the movable part in alignment with the load pointer after each weighing operation, and means for limiting the movement of the movable part within an angle which is not less than 72 degrees and not more than 90 degrees.

GEORGE E. CHATILLON.